(12) United States Patent
Potter et al.

(10) Patent No.: US 7,847,532 B2
(45) Date of Patent: *Dec. 7, 2010

(54) CENTRALIZED CONTROLLER AND POWER MANAGER FOR ON-BOARD POWER SYSTEMS

(75) Inventors: Geoffrey Potter, New Castle, NH (US); Hong Mao, North Andover, MA (US)

(73) Assignee: Astec International Limited, Kwun Tong, Kowloon (HK)

( * ) Notice: Subject to any disclaimer, the term of this patent is extended or adjusted under 35 U.S.C. 154(b) by 343 days.

This patent is subject to a terminal disclaimer.

(21) Appl. No.: 12/009,837

(22) Filed: Jan. 22, 2008

(65) Prior Publication Data

US 2008/0238393 A1    Oct. 2, 2008

Related U.S. Application Data

(60) Provisional application No. 60/881,340, filed on Jan. 19, 2007.

(51) Int. Cl.
*J05F 1/40*    (2006.01)

(52) U.S. Cl. .................................. 323/283; 307/18

(58) Field of Classification Search ......... 323/282–289, 323/239, 267, 272; 363/89, 95, 97, 98, 132; 307/75, 82, 66

See application file for complete search history.

(56) References Cited

U.S. PATENT DOCUMENTS

| | | | |
|---|---|---|---|
| 5,751,150 | A | 5/1998 | Rippel et al. |
| 6,191,964 | B1 * | 2/2001 | Boylan et al. ................. 363/89 |
| 6,249,111 | B1 | 6/2001 | Nguyen |
| 6,351,108 | B1 | 2/2002 | Burstein et al. |
| 6,366,069 | B1 | 4/2002 | Nguyen et al. |
| 6,400,127 | B1 | 6/2002 | Giannopoulos |
| 6,421,259 | B1 | 7/2002 | Brooks et al. |
| 6,437,545 | B2 | 8/2002 | Sluijs |
| 6,465,993 | B1 | 10/2002 | Clarkin et al. |
| 6,563,294 | B2 | 5/2003 | Duffy et al. |
| 6,771,052 | B2 | 8/2004 | Ostojic |
| 6,788,035 | B2 | 9/2004 | Bassett et al. |
| 6,795,009 | B2 | 9/2004 | Duffy et al. |
| 6,809,678 | B2 * | 10/2004 | Vera et al. .................... 341/166 |
| 6,819,537 | B2 | 11/2004 | Pohlman et al. |
| 6,853,169 | B2 | 2/2005 | Burstein et al. |

(Continued)

OTHER PUBLICATIONS

"A New Bus Architecture?" Linnea Brush, Aug. 27, 2007; pp. 1-2.

(Continued)

*Primary Examiner*—Rajnikant B Patel
(74) *Attorney, Agent, or Firm*—Harness, Dickey & Pierce, P.L.C.

(57) ABSTRACT

A controller for controlling a plurality of DC-DC switching cells each configured to generate an output voltage in response to receiving a PWM control signal from the controller. The controller includes a plurality of output ports for outputting a plurality of PWM control signals, and at least one input port for receiving a plurality of output voltages from the plurality of switching cells. The controller is configured to sample the plurality of output voltages one at a time via a multiplexer and to regulate the output voltages in response to the sampling.

44 Claims, 14 Drawing Sheets

U.S. PATENT DOCUMENTS

| | | |
|---|---|---|
| 6,911,808 B1 | 6/2005 | Shimamori |
| 6,928,560 B1 | 8/2005 | Fell, III et al. |
| 6,933,709 B2 | 8/2005 | Chapuis |
| 6,936,999 B2 | 8/2005 | Chapuis |
| 6,947,273 B2 | 9/2005 | Bassett et al. |
| 6,967,851 B2 | 11/2005 | Yang et al. |
| 6,984,965 B2 | 1/2006 | Vinciarelli |
| 7,005,835 B2 | 2/2006 | Brooks et al. |
| 7,007,176 B2 | 2/2006 | Goodfellow et al. |
| 7,212,419 B2 | 5/2007 | Vinciarell |
| 7,239,115 B2 | 7/2007 | Chapuis et al. |
| 7,239,257 B1 | 7/2007 | Alexander et al. |
| 7,249,267 B2 | 7/2007 | Chapuis |
| 7,274,175 B2 * | 9/2007 | Manolescu .................. 323/267 |
| 7,315,157 B2 | 1/2008 | Chapuis |
| 7,373,527 B2 | 5/2008 | Chapuis |
| 7,394,236 B2 | 7/2008 | Chapuis et al. |
| 7,423,892 B2 | 9/2008 | Vinciarelli |
| 7,467,309 B2 | 12/2008 | Templeton |
| 7,479,772 B2 * | 1/2009 | Zane et al. .................. 323/272 |
| 7,521,913 B2 | 4/2009 | Tang et al. |
| 2004/0095118 A1 | 5/2004 | Kernahan |
| 2007/0097563 A1 | 5/2007 | Hagiwara et al. |
| 2008/0137379 A1 | 6/2008 | Mao |

OTHER PUBLICATIONS

Summit Microelectronics, Inc.; SMB120 Nine-Channel DC/DC Digitally Programmable System Power Manager; pp. 1-38; Apr. 12, 2007.

Texas Instruments; UCD9240 Digital Point Load System Controller; pp. 1-21; Apr. 2007.

Texas Instruments; PTD08A020W 20-A, 4.75-V to 14-V Input, Non-Isolated, Wide-Output, Digital Powertrain Module, pp. 1-14; Jan. 2008.

Texas Instruments; USD7230 Digital Control Compatible Synchronous Buck Gate Drivers with Current Sense Conditioning Amplifier; pp. 1-25; Mar. 2007.

"Digital Power Packaging and How It Could Change the Power Industry"; Texas Instruments; B. Narveson; APEC, Feb. 27, 2007; pp. 1-27.

Silicon Laboratories; Si8250/1/2 Digital Power Controller; pp. 1-32; Mar. 2006.

* cited by examiner

CENTRALIZED CONTROLLER AND POWER MANAGER FOR ON-BOARD POWER SYSTEMS

CROSS-REFERENCE TO RELATED APPLICATIONS

This application claims the benefit of U.S. Provisional Application No. 60/881,340, filed on Jan. 19, 2007.

FIELD

The present disclosure relates to distributed power systems.

BACKGROUND

The statements in this section merely provide background information related to the present disclosure and may not constitute prior art.

There are generally two kinds of power architectures for telecom and computing applications: centralized power architecture and decentralized power architecture. A centralized architecture is a power system in which all power related functions, from input power to generation of the DC circuit voltage, are contained within one physical area. A decentralized power architecture (also referred to as distributed power architecture) is a power system that is functionally and physically partitioned such that the final stage of power processing is located in correspondence to load functions and/or packaging. Decentralized power architectures can provide certain electrical performance advantages over centralized power architectures. In a decentralized architecture, the DC distribution system becomes much shorter and simpler, thereby eliminating power losses in the distribution network. Better dynamic response performance is also achieved due to the lower inductance between converters and their loads. Other advantages include distributed heat load, enhanced reliability, and lower total cost. The centralized power architecture is becoming less common in today's electronic systems.

One of the most dominant decentralized architectures, referred to as "on-board-power," provides the dc-dc conversion function on each board. In such a system, the dc-dc power converters essentially become components on the circuit boards, and the diffused nature of power dissipation allows for a large amount of flexibility in the electrical and cooling system design.

There are two primary categories of decentralized power architectures for telecom and datacom applications: distributed power architecture (DPA) and intermediate bus architecture (IBA). A DPA power system is illustrated in FIG. 1 and indicated generally by reference numeral 100. In the example of FIG. 1, a 48V bus 102 supplies a load board 104, and dc-dc converters 106, 108 and 110 are located close to the load circuitry. A first regulated dc-dc converter 106 supplies a first load 112 and a non-isolated (NI) dc-dc converter 110 supplies a second load 116. Unlike an isolated converter, the input and output of an NI converter share a common ground. A second regulated dc-dc converter 108 supplies a third load 114. Each dc-dc converter in the system is regulated by a digital or analog controller integrated within such dc-dc converter. A power manager 118 is implemented using one of, or a combination of, a dedicated integrated chip, an FPGA and a microprocessor. The function of the power manager/supervisor may include monitoring, sequencing, and margining. In addition, the power manager may communicate with load circuitry on the load board and with other systems beyond the board via a communication bus 120.

FIG. 2 illustrates an intermediate bus architecture (IBA) power system 200. Instead of directly supplying loads like the regulated converters 106 and 108 shown in FIG. 1, a bus converter 202 operating at open loop provides an unregulated intermediate bus voltage to three cascaded secondary-stage NI dc-dc converters 204, 206 and 208 that are mounted physically close to load circuitry on a load board 210. Each of the dc-dc converters 204, 206 and 208 supplies a voltage directly to one of a first load 212, a second load 214 and a third load 216, respectively, and is regulated by a digital controller integrated within such dc-dc converter. A power manager 218 has the same functionality as the power manager 118 of FIG. 1. This architecture is generally simpler and more flexible than the DPA.

As the number of supply voltages continues to increase, the number of analog integrated circuits needed to monitor, sequence, and margin them also increases. As a result, costs rise and more board space is consumed. When changes to parameters such as voltage threshold or reset-timeout period are necessary, a new device may be required. One way to reduce the level of circuitry complexity is to use a digital system management IC that combines monitoring, sequencing and other functions. With programmability, the power management/supervising becomes flexible and more intelligent, and the overall cost and board space are reduced. Moreover, a communication can be established between the power manager and load circuitry or higher-level digital systems.

Today's state-of-the-art control technique for dc-dc converters, however, generally remains analog and is not matched with today's digital power management and powered digital systems. However, digital control has demonstrated certain advantages over analog control, such as reconfiguration flexibility, control adaptability to system variation, low power consumption, high reliability, elimination of component tolerances and ageing, and ease of integration and interface with other digital systems.

In today's dc-dc converters, each controller dedicatedly controls a single dc-dc converter. With the proliferation of dc-dc converters on a single load board, the number of dedicated controllers proportionally increases. With the advance of digital controller technology, dc-dc converters will be able to interface with one another or other digital systems through a communication bus. For example, the dc-dc converters may be controlled by their on-board controllers in response to control commands received over a synchronous serial communication bus. However, the overall cost of the control circuitry goes up with the increased number of controllers, and the communication protocol also becomes a concern.

SUMMARY

According to one aspect of the present disclosure, a controller is provided for controlling a plurality of DC-DC switching cells each configured to generate an output voltage in response to receiving a PWM control signal from the controller. The controller includes a plurality of output ports for outputting a plurality of PWM control signals, and at least one input port for receiving a plurality of output voltages from the plurality of switching cells. The controller is configured to sample the plurality of output voltages one at a time via a multiplexer and to regulate the output voltages in response to the sampling.

According to another aspect of the present disclosure, a controller is provided for controlling a plurality of DC-DC switching cells each configured to generate an output voltage in response to receiving a PWM control signal from the controller. The controller includes a plurality of output ports for outputting a plurality of PWM control signals to the plurality of switching cells, and at least one input port for receiving one or more output voltages from the plurality of switching cells. The controller is configured to perform monitoring, sequencing and/or margining functions for the plurality of switching cells.

According to yet another aspect of the present disclosure, a DC-DC power converter includes a switch, a rectifier, and an output filter coupled to the rectifier for generating a DC output voltage from a DC input voltage, an output port for outputting the DC output voltage, an output port for outputting a PWM control signal to a switching cell, and a controller for controlling said switch and generating said PWM control signal.

According to still another aspect of the present disclosure, a method is provided for using a single controller to control a plurality of DC-DC switching cells each configured to generate an output voltage in response to a PWM control signal from the controller. The method includes providing a PWM control signal to each of the switching cells, receiving via a multiplexer a plurality of output voltages from the plurality of switching cells, sampling the received plurality of output voltages one at a time, and adjusting the PWM control signal for one of said switching cells in response to its sampled output voltage.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
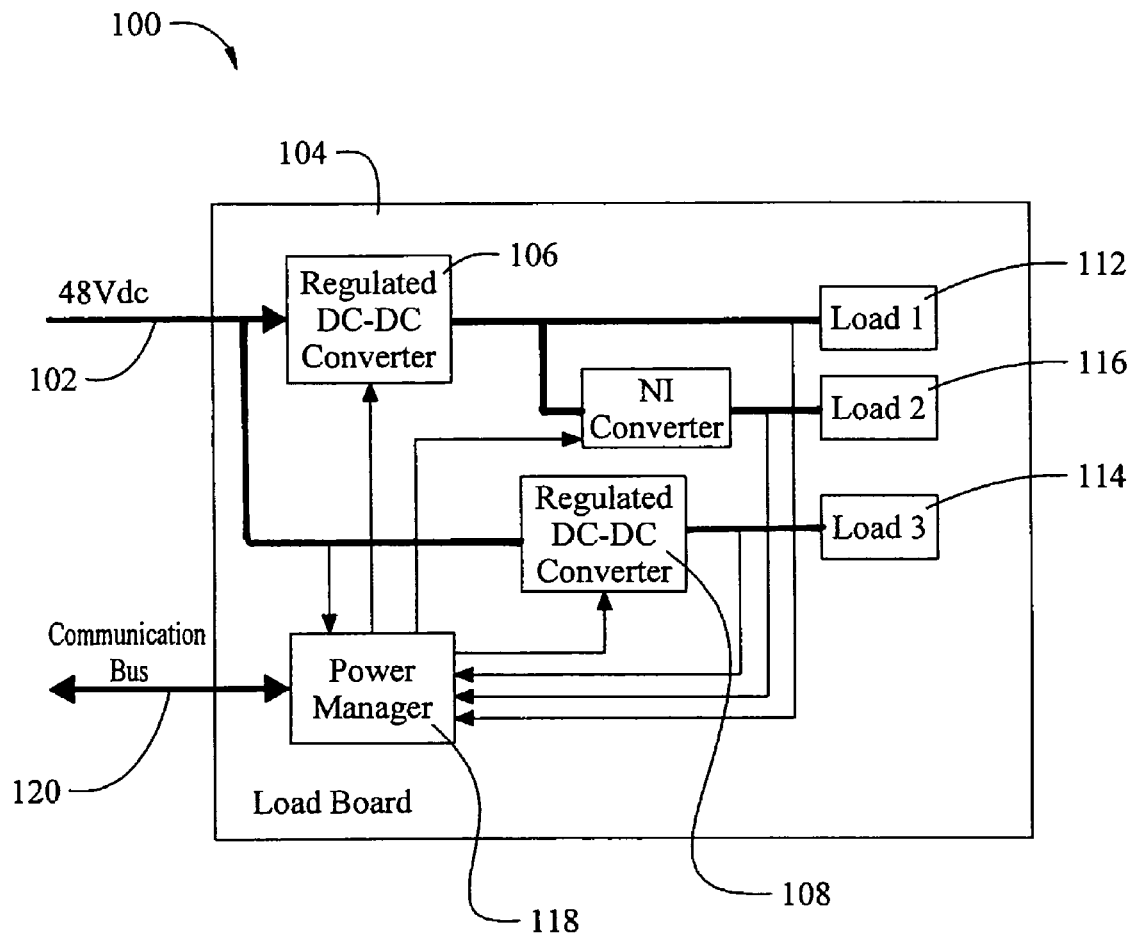
FIG. 1 is a block diagram of an DPA power system.
Figure 2:
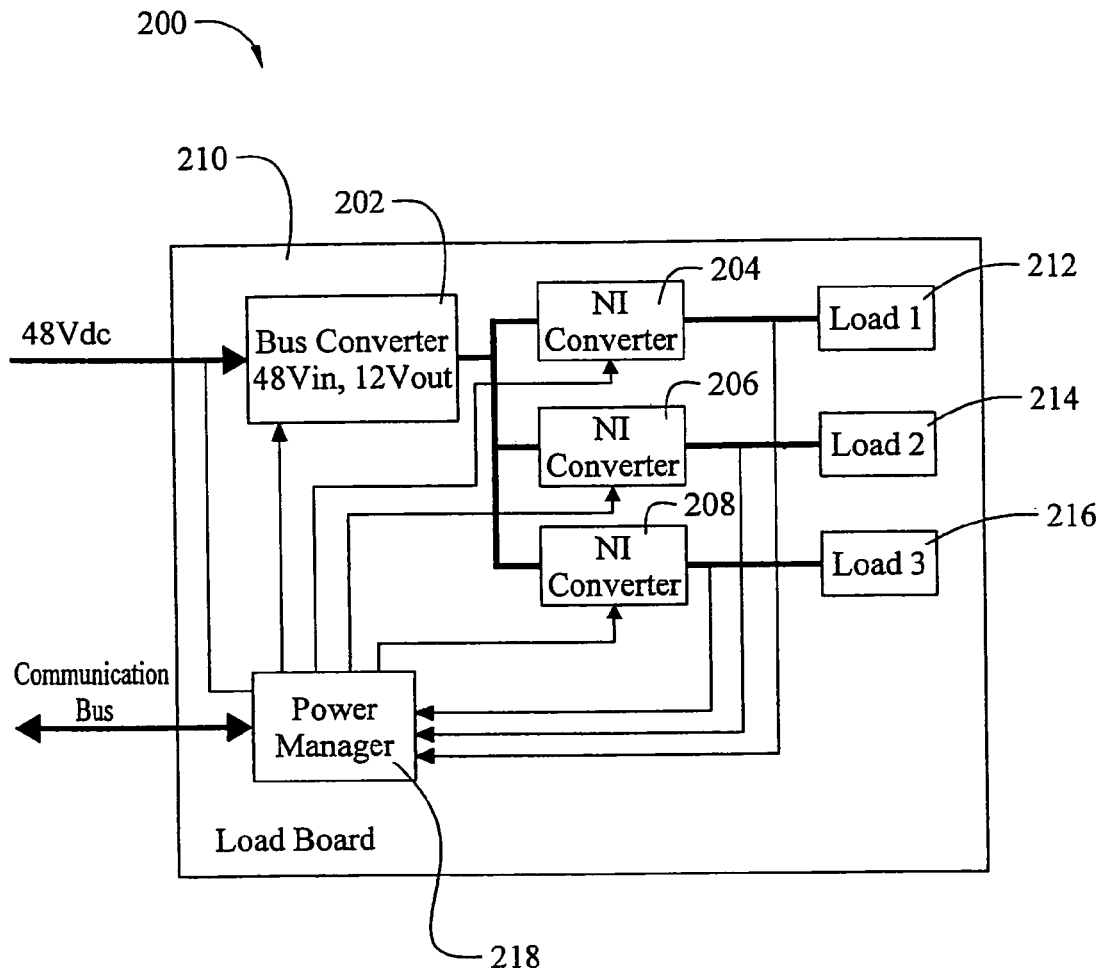
FIG. 2 is a block diagram of an IBA power system.

The following description is merely exemplary in nature and is not intended to limit the present disclosure, application, or uses. It should be understood that throughout the drawings, corresponding reference numerals indicate like or corresponding parts and features.

A method for the control of a distributed power system disclosed herein involves centralizing the discrete controllers by incorporating them into a centralized controller. In other words, discrete controllers originally built in the individual dc-dc converters are replaced by a centralized controller. The centralized controller can be designed down on the load boards in a board-level system design, or modularized into one or more controller modules (i.e., packaged functional assemblies of electronic components that are configured for attachment to circuit boards). Additionally, or alternatively, the control and power management functionality is combined into a centralized controller/power manager. Thus, the controllers, power manager(s) and their peripheral circuitry are all centralized. The centralized controllers can be analog or digital controller modules, or a hybrid analog and digital control module. This centralization promotes efficient resource sharing and reduces overall system cost and board space. In addition, address and communication buses employed in discrete digital controllers can be eliminated.

Figure 3A:
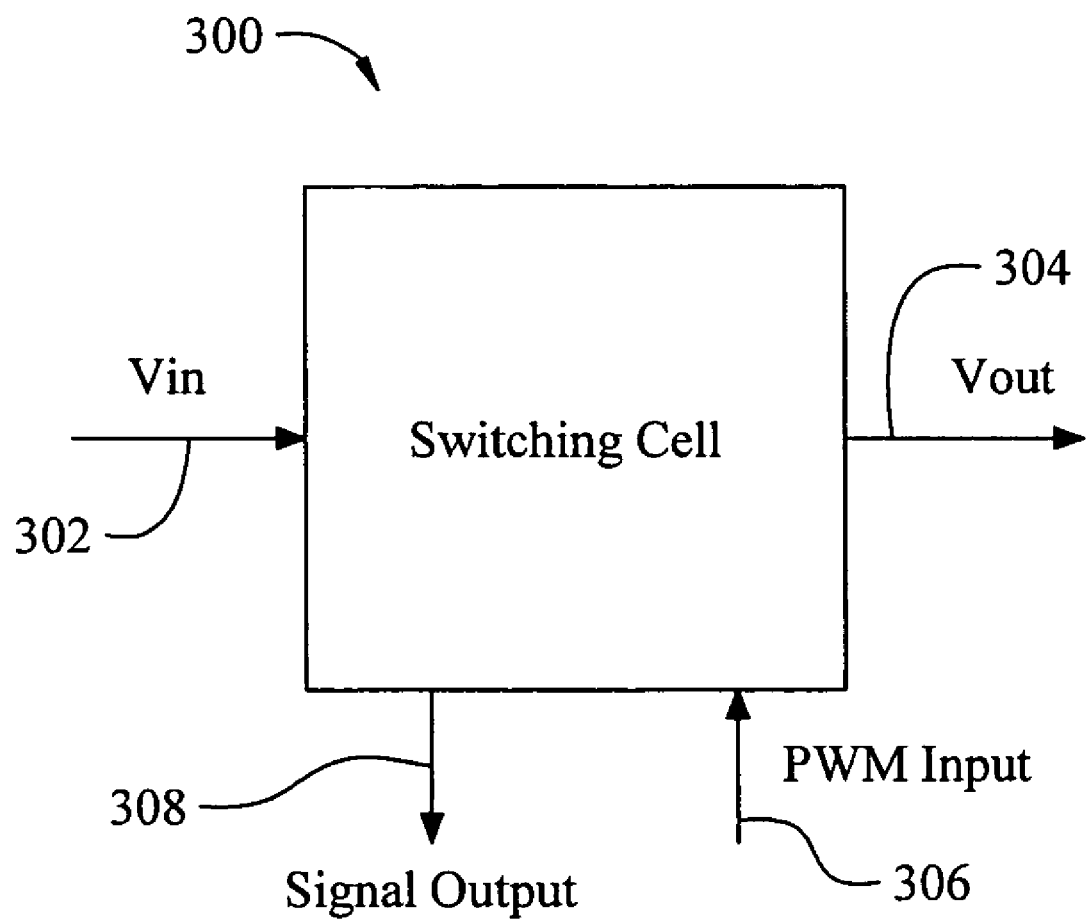
FIG. 3a is block diagram of a switching cell.

The centralized controllers are used in a system with switching cells such as the switching cell 300 shown in FIG. 3a. The switching cell 300 has no control functionality included. Instead, the switching cells require external controllers, such as one of the centralized controllers disclosed herein, in order to generate a DC output voltage. The switching cell includes an input voltage port 302, an output voltage port 304 and a PWM input port 306. External PWM signals are applied to the PWM input port to initiate and control DC-DC power conversion by the switching cell. The particular switching cell shown in FIG. 3a also includes a sense port 308 that can be used, depending on the internal configuration of the switching cell, to output various status signals such as current, temperature, and/or fault signals.

Figure 3B:
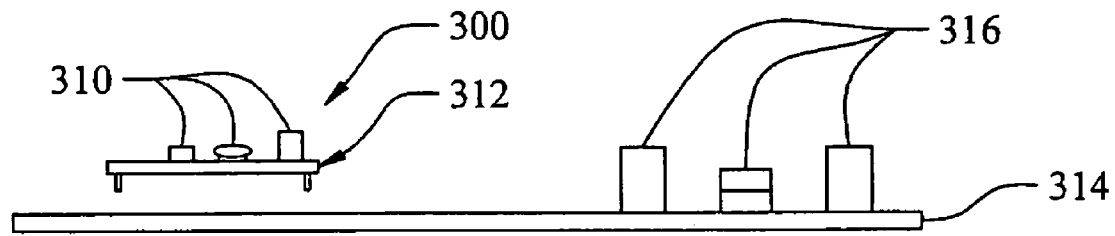
FIG. 3b illustrates a circuit board based switching cell module for mounting on a system circuit board.
Figure 3C:
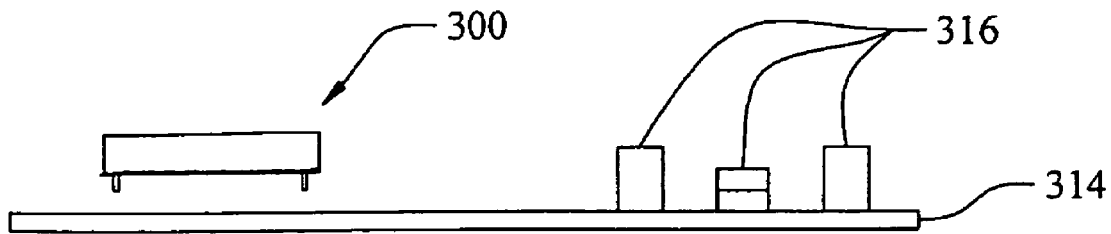
FIG. 3c illustrates an integrated circuit switching cell module for mounting on a system circuit board.

Similar to the centralized controllers, the switching cells can be designed down on the boards in a board-level system design or modularized as switching cell modules (i.e., packaged functional assemblies of electronic components that are configured for attachment to circuit boards) that can be sold as products. As illustrated in FIG. 3b, a switching cell module 300 can include discrete components 310 on a circuit board 312 and packaged for mounting on a system board 314 having additional components 316, switching cell modules and/or other devices mounted thereon. As shown in FIG. 3c, a switching cell module 300 can also be an integrated circuit for mounting on a system board 314 having additional components 316, switching cell modules and/or other devices mounted thereon.

Each switching cell has a switching power supply architecture inside. The switching cell is supplied by an input voltage at the input port and driven by a PWM input signal applied to the PWM input port. The cell generates an output voltage as a certain voltage ratio from input to output. The voltage ratio is adjustable with the pulse width or frequency of the PWM input signal depending on the internal configuration of the cell. Through the PWM input port, a controller can fully control the switching cell. Such functions as voltage regulation, voltage positioning, enabling and disabling, soft start, sequencing, and protections of the switching cell can be implemented by the separate controller through the PWM input port. Converter connections such as enable/disable, trimming and remote sense are unnecessary and can be removed because those functions can be implemented by the centralized controller through the PWM input port.

Figure 4:
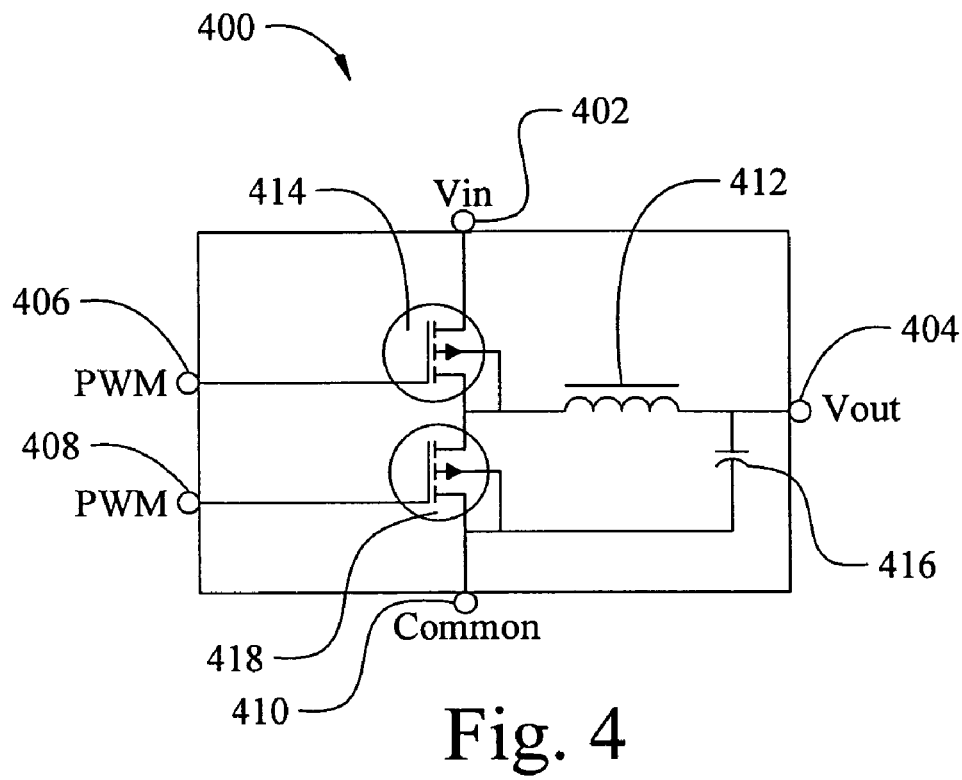
FIG. 4 is a diagram of a buck converter switching cell.

The internal configuration of a switching cell can be that of any switching power converter. A switching cell 400 having a buck converter configuration is illustrated in FIG. 4. The switching cell includes a voltage input port 402, a voltage output port 404, two PWM input ports 406 and 408, and a common or ground port 410. Inside the switching cell is a basic buck converter including an inductor 412, a switch 414 and a capacitor 416. A PWM controlled transistor 418 is used in place of a diode in the buck converter. Alternatively, an actual diode or a diode connected transistor can be used in place of the transistor 418. Although such a substitution may decrease the efficiency of the converter, it would eliminate the need for PWM input port 408.

Figure 5:
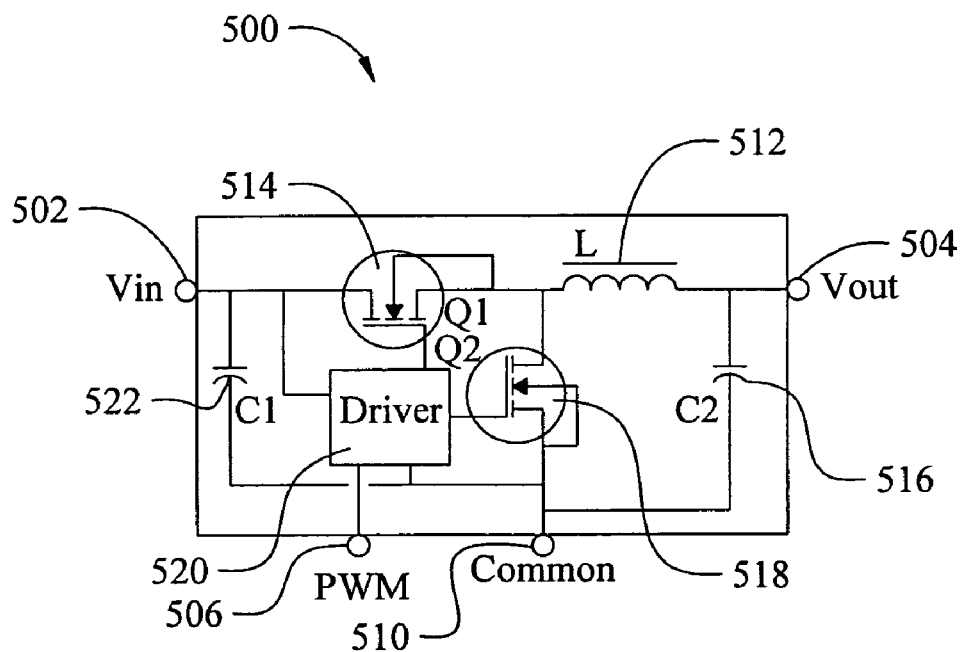
FIG. 5 is a diagram of a buck converter switching cell including a driver.

FIG. 5 illustrates another buck converter switching cell 500. Like the switching cell 400 in FIG. 4, the switching cell of FIG. 5 includes a voltage input port 502, a voltage output port 504 and a common or ground port 510. Similarly, the switching cell 500 also contains the basic buck converter elements, an inductor 512, a switch 514, a capacitor 516 and a switched transistor 518 used in place of a diode. The switching cell 500, however, includes only one PWM input port 506. Only one PWM input port is needed because the switching cell also contains a driver 522 that controls the switch 514 and the switched transistor 518. An input capacitor 522 is also included in the switching cell 500.

Figure 6:
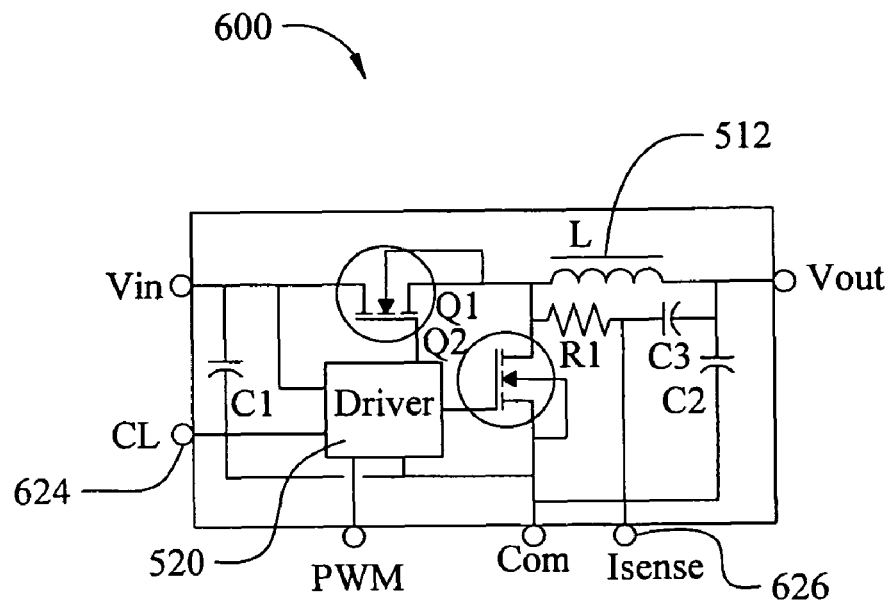
FIG. 6 is a diagram of a buck converter switching cell including a driver and a sense port for sensing an output current.
Figure 7:
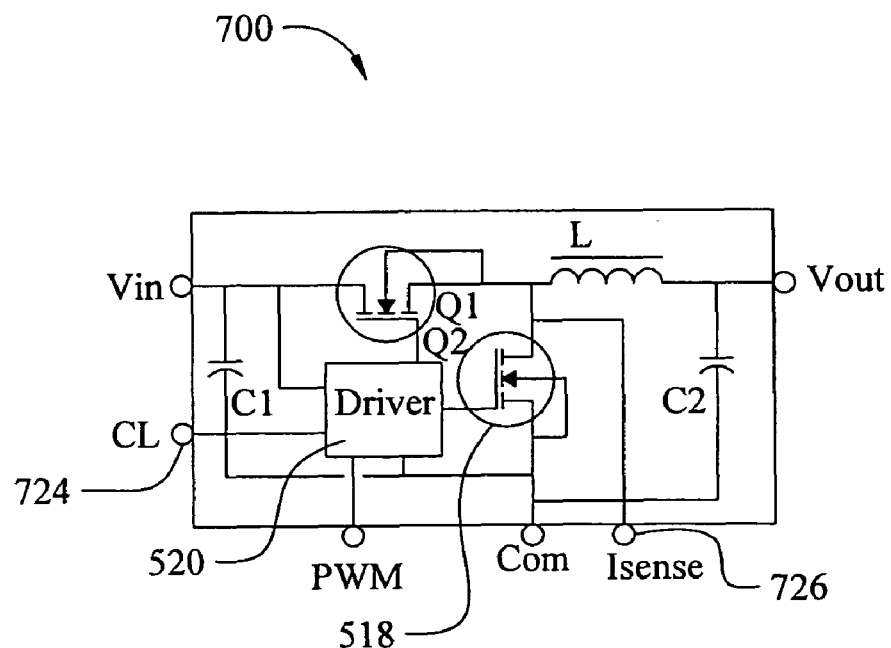
FIG. 7 is a diagram of a buck converter switching cell including a driver and a sense port for sensing freewheeling switch voltage to measure current flow.

FIGS. 6 and 7 both illustrate buck converter switching cells, 600 and 700 respectively, based on the switching cell of FIG. 5. However, both switching cells 600 and 700 include a current limit input port 624 and 724 for providing a shutdown signal to the driver and a sense port 626 and 726 for generating an output current signal. Switching cell 600 is configured to generate, at the sense port 626, a signal representative of the current through the inductor 512 through the use of an additional resistor R1 and capacitor C3 in parallel with the inductor 512. The sense port 726 of switching cell 700 is connected across the drain-sink junction of the transistor. Thus, the sense port 726 can be used to sense inductor current by sensing the voltage drop across the internal drain-source resistance of the conducting transistor 518. Such a measurement can be used to limit or monitor output current from the switching cell.

Figure 8:
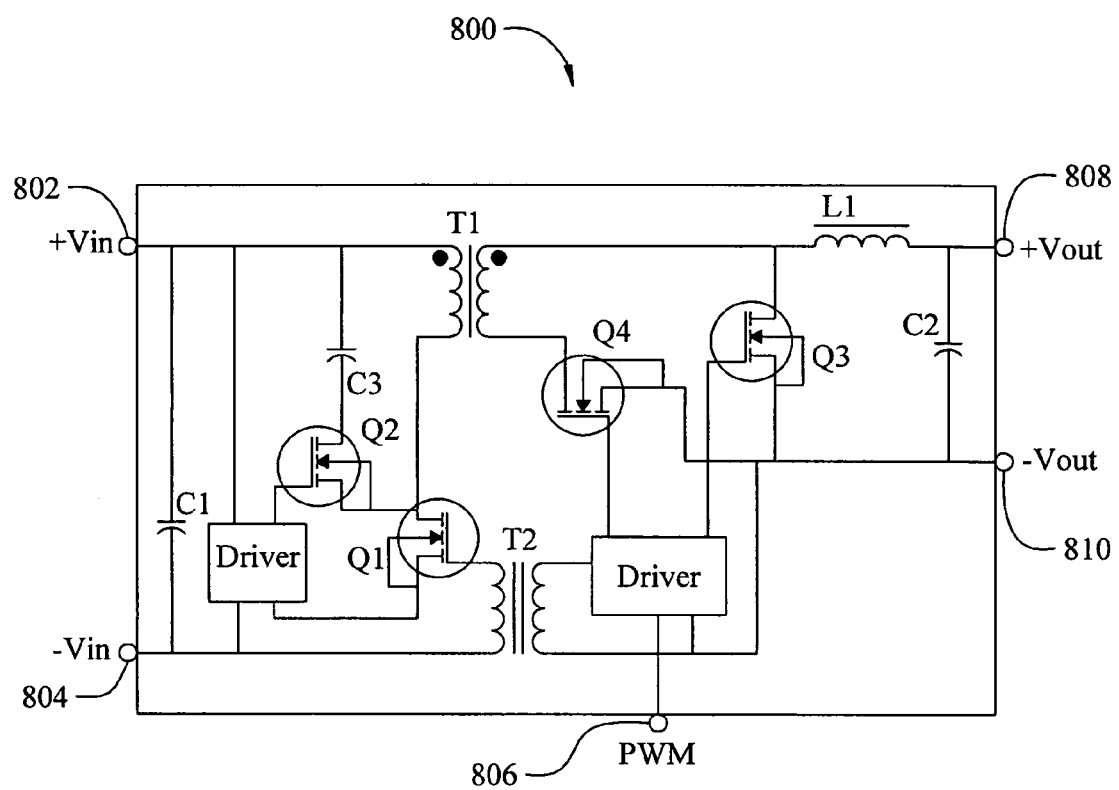
FIG. 8 is a diagram of a forward converter switching cell.
Figure 9:
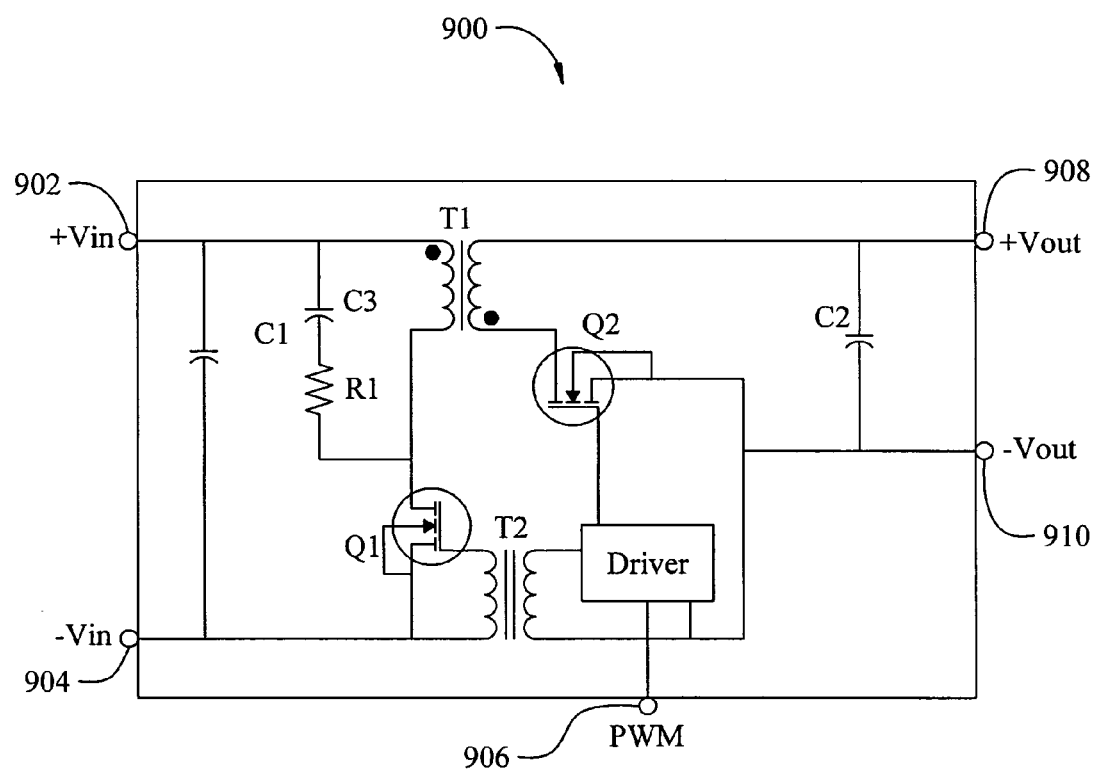
FIG. 9 is a diagram of a flyback switching cell.

Switching cells 800 and 900, illustrated in FIGS. 8 and 9 respectively, have isolated switching power converter topologies including at least one transformer. A forward converter topology in switching cell 800 is illustrated in FIG. 8. The switching cell has five ports, two voltage input ports 802 and 804, a PWM input port 806, and two voltage output ports 808 and 810. The switching cell 900 in FIG. 9 has a flyback converter topology. This switching cell also has five ports, two voltage input ports 902 and 904, a PWM input port 906, and two voltage output ports 908 and 910.

A switching cell may optionally include sensor and protection circuitry such as over temperature, over current, short circuit, over voltage protections and under voltage lockout. At the event of faults, the switching cell may take action to protect itself, for example shutting off the cell by disabling the switch driver and simultaneously sending out fault signals, or the switching cell may send out the sensed signals of currents, temperatures or other parameters through a sense port.

Depending on the application, a switching cell may have a fixed or variable voltage conversion ratio. If output voltage regulation is not needed, the switching cell can be controlled by an external controller with a fixed duty cycle and thus the voltage conversion ratio is fixed. Otherwise, the duty cycle of the PWM input can be adjusted by a separate controller in order to regulate the output voltage according to a sensed parameter such as input or output voltage.

Figure 10:
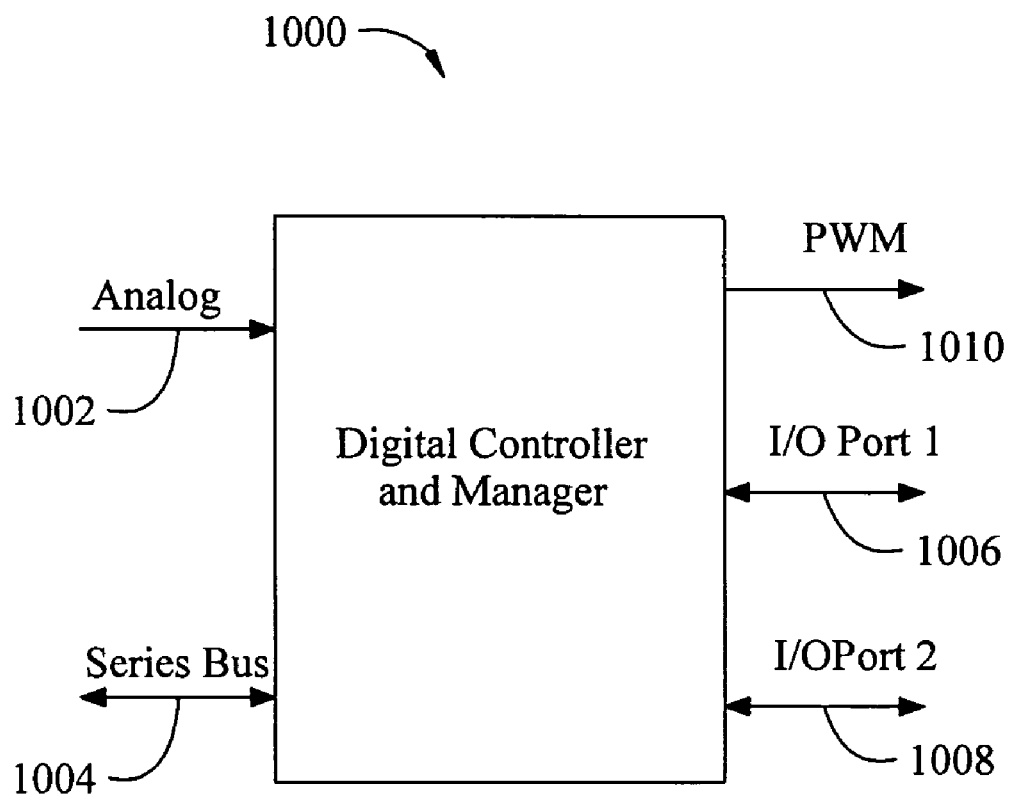
FIG. 10 is a block diagram of a digital controller and power manager.

A centralized digital controller and power manager 1000, as shown in FIG. 10, can provide power control and management for some or all switching cells in a distributed system. The digital controller 1000 includes an analog input port 1002, a serial bus port 1004, two input/output (I/O) ports 1006 and 1008, and a PWM output port 1010. Alternatively, or additionally, the controller may include more or fewer of any of the ports described above. As noted above, the digital controller can be a packaged and/or integrated module or can be designed down on the load boards in a board-level system design. Alternatively or additionally, the digital controller can be an ASIC, FPGA or microcontroller chip.

The basic control function of a digital controller is the control and voltage regulation of switching cells. Output voltages of the switching cells that are distributed across a load board can be sensed by the digital controller via one of the I/O ports. The controller adjusts the pulse width of PWM signals sent to the corresponding switching cells' PWM input port to regulate the output voltage of that switching cell.

Power management functions can also be implemented by the centralized analog and/or digital controller. Those functions include, but are not limited to, monitoring switching cell parameters, sequencing and margining switching cells, providing programmable switching frequency, and remote sensing.

In monitoring a switching cell, the controller can monitor parameters such as voltages, currents and temperatures for protection, diagnostic and other purposes. The controller sequences the switching cell modules by controlling the order in which different switching cells' output voltages are turned on and off. For example, in a system with three switching cells, the first switching cell may need to have a valid output voltage before the second and third switching cells are activated. Firmware in a digital controller can start the first switching cell and simultaneously monitor its output voltage. When the voltage from the first switching cell reaches the desired level and stability, the digital controller can delay for a specified length of time and then turn on the second and third switching cells. Margining provides a small fixed variation in supply output voltages, which is used for diagnostic testing and exercising the end equipment to simulate maximum and minimum power limit conditions. A board-level system designer may need to adjust switching cells' switching frequencies in order to reduce EMI and optimize external filtering components. The digital controller allows the frequency of PWM signals sent to the switching cells to be easily adjusted as needed. Remote sensing by the digital controller allows sensing points to be placed as close as possible to a load, rather than within the power converter itself, to provide tight voltage regulation.

Figure 11A:
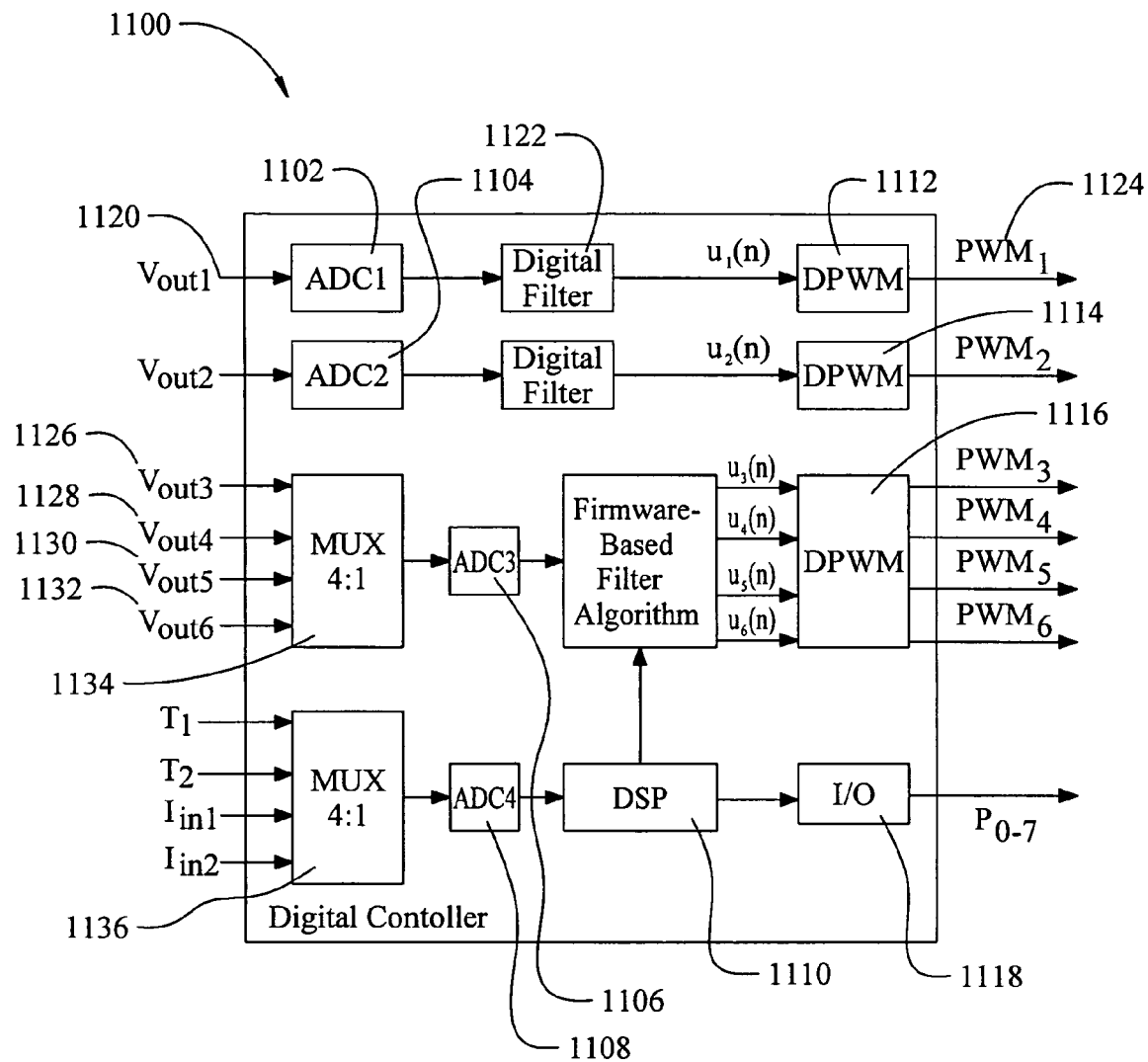
FIG. 11a is a diagram of a digital controller and power manager.

FIG. 11a illustrates a digital controller 1100 according to another aspect of the present disclosure. The digital controller includes several analog-to-digital converters (ADCs) 1102, 1104, 1106 and 1108. The ADC converts external analog signals to digital signals for digital signal processing. The digital controller also includes a digital signal processor (DSP) 1110. The DSP provides digital signal processing and management functions. Firmware-based algorithms can be implemented with DSPs. The digital controller further includes digital pulse width modulation (DPWM) cells 1112, 1114 and 1116 that generate programmable PWM signals for the switching cells. Input/output port (I/O Port) 1118 permits digital signals to be sent from and received by the controller. Power management algorithms can be implemented in the digital controller by built-in firmware. The DSP 1110 can interface with all (or less than all) of the switching cells in a system and provide flexible and programmable power management and diagnostic functions to the whole power system.

In a power system with a requirement of multiple output voltages, multiple switching cells are controlled with multiple PWM outputs from the DPWM cells. The voltage regulation demands for different types of loads can be quite different. For example, a CPU may need tight voltage regulation and fast recovery when the voltage is disturbed by transients such as load change and input voltage variation. However, other loads may not require fast transient response and the regulation may not need to be as tight as the regulation of a CPU voltage. Therefore, the control requirements for different switching cells that supply different loads may be different, such that different methods of control can be used according to load requirements. Additionally, when a switching cell operates at fixed duty cycle, i.e., open loop or unregulated, an output of a DPWM cell can be easily programmed with an unmodulated PWM signal having a fixed duty cycle.

For regulated output voltages, at least two kinds of control loops can be built into a single digital controller. One control loop is a fast control loop. A fast control loop uses a higher sampling frequency and fast devices such as a fast ADC and hardware-oriented digital filtering. An example of a fast control loop is illustrated in FIG. 11*a*. The fast control loop is illustrated receiving a system output voltage 1120 at ADC 1102. This output voltage is passed to a digital filter 1122. The output of the digital filter is provided to the DPWM cell 1112 and the DPWM cell generates a PWM signal 1124.

In order to obtain fast regulation of the output voltage 1120, the digital control path preferably has a minimum time delay. Therefore, ADC 1102 generally needs a reasonably high sampling rate and low conversion time. In addition, the digital filter 1122 and DPWM 1112 should operate at fairly high clock frequencies. Therefore, in a fast control loop, the ADC 1102 can be a high-speed ADC and the digital filter 1122 can be a hardware-oriented digital filter that operates faster than firmware-oriented digital filters.

Voltage regulation is achieved through a control path from ADC 1102 input to DPWM cell 1112 output. The output voltage 1120 is sampled and converted to a digital value by the ADC 1102. The digital filter 1122 (also referred to as a digital compensator) generates a digital value u(n) based on the difference between an output of the ADC 1102 and a fixed voltage reference. By feeding digital value u(n) to the DPWM cell 1112, the PWM signal 1124 having a pulse width proportional to the digital value u(n) is generated. This PWM signal 1124 is provided to a PWM input of a switching cell. The output of that switching cell is the output voltage 1120 sampled by the ADC 1102. Thus, the feedback loop is closed and voltage regulation can be achieved.

Figure 11B:
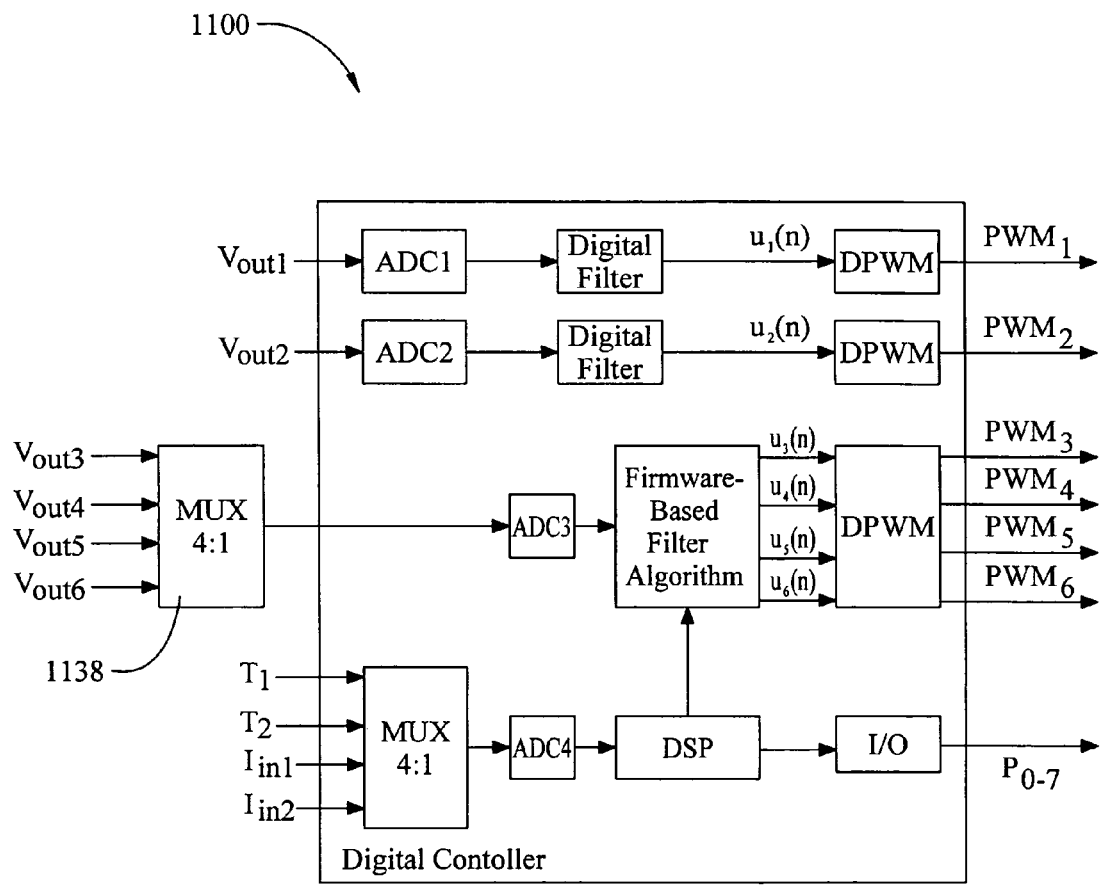
FIG. 11b is a diagram of a digital controller and power manager receiving feedback voltages via a multiplexer.

The second type of control loop is a slow control loop. A slow control loop has a lower effective sampling switching frequency and can have firmware-oriented digital filtering. As shown in FIG. 11*a*, four output voltages 1126, 1128, 1130 and 1132 share a single ADC 1106 through a 4:1 multiplexer 1134. The ADC 1106 only selects one of the output voltages to convert to a digital signal at a time. This sampling can follow a programmable sequence. The four input voltages can equally share the ADC 1106, or the voltages may be sampled according to a sampling priority. For example, if output voltage 1126 needs faster regulation than output voltages 1128, 1130 and 1132, it can be sampled three times in a cycle compared to once per cycle for the other voltages. Although the multiplexer 1134 is illustrated as an internal multiplexer of the digital controller in FIG. 11*a*, an external multiplexer 1138, as illustrated in FIG. 11*b* may also be used. An external multiplexer is especially beneficial when a faster multiplexer than an internal multiplexer is needed. When an external (or internal) multiplexer is employed, the controller can select a particular channel/address via the multiplexer's address port, enable the multiplexer, and then read the selected channel/address.

Instead of using hardware digital filtering, the slow loop digital filtering is implemented using firmware. It should be noted that the firmware-based digital filtering is only one of many firmware-based algorithms to achieve voltage regulation.

In a slow control loop, hysteresis control can also be used to regulate output voltage. In this type of shepherding regulation, an upper and lower voltage limit above and below the desired nominal output voltage form a voltage window. The upper voltage limit and the lower voltage limit are trigger levels. As long as the output voltage is between the upper and lower voltage limits, no adjustments are made to the PWM signal provided to the switching cell generating the output voltage. If the output voltage drops and reaches the lower trigger level, such as when a load is increased or the input voltage decreased, the hysteresis control algorithm increase the duty cycle by a certain preset amount to bring the output voltage back into the voltage window. If the increased amount of duty cycle is insufficient to bring the voltage back into the window, the next time that voltage is sampled, the duty cycle will be increased again by the same amount as the previous time. This continues until the output voltage is back in the voltage window. Similarly, if the output voltage increases, such as by a decrease in load or an increase in input voltage, the hysteresis control algorithm decreases the duty cycle by the same amount to decrease the output voltage and bring it back within the voltage window. This shepherding method can be used in a dedicated control loop or a control loop that utilizes a multiplexer such as that described above.

The digital controller in FIG. 11*a* also uses the ADC 1108 to monitor the switching cells' operating parameters, such as currents and temperatures, via a multiplexer 1136. In the event of a fault in one of the switching cell, the DSP 1110 can turn off one or more channels of the DPWM 1116 or trigger a soft start-up of switching cells. The DSP also provides operation data for diagnostic purposes.

It should be noted that the digital controller in FIG. 11*a* is only one possible embodiment disclosed herein. Based on the same concept, the resources of the controller are reducible or expandable depending on the complexity of the controlled power system.

Figure 12:
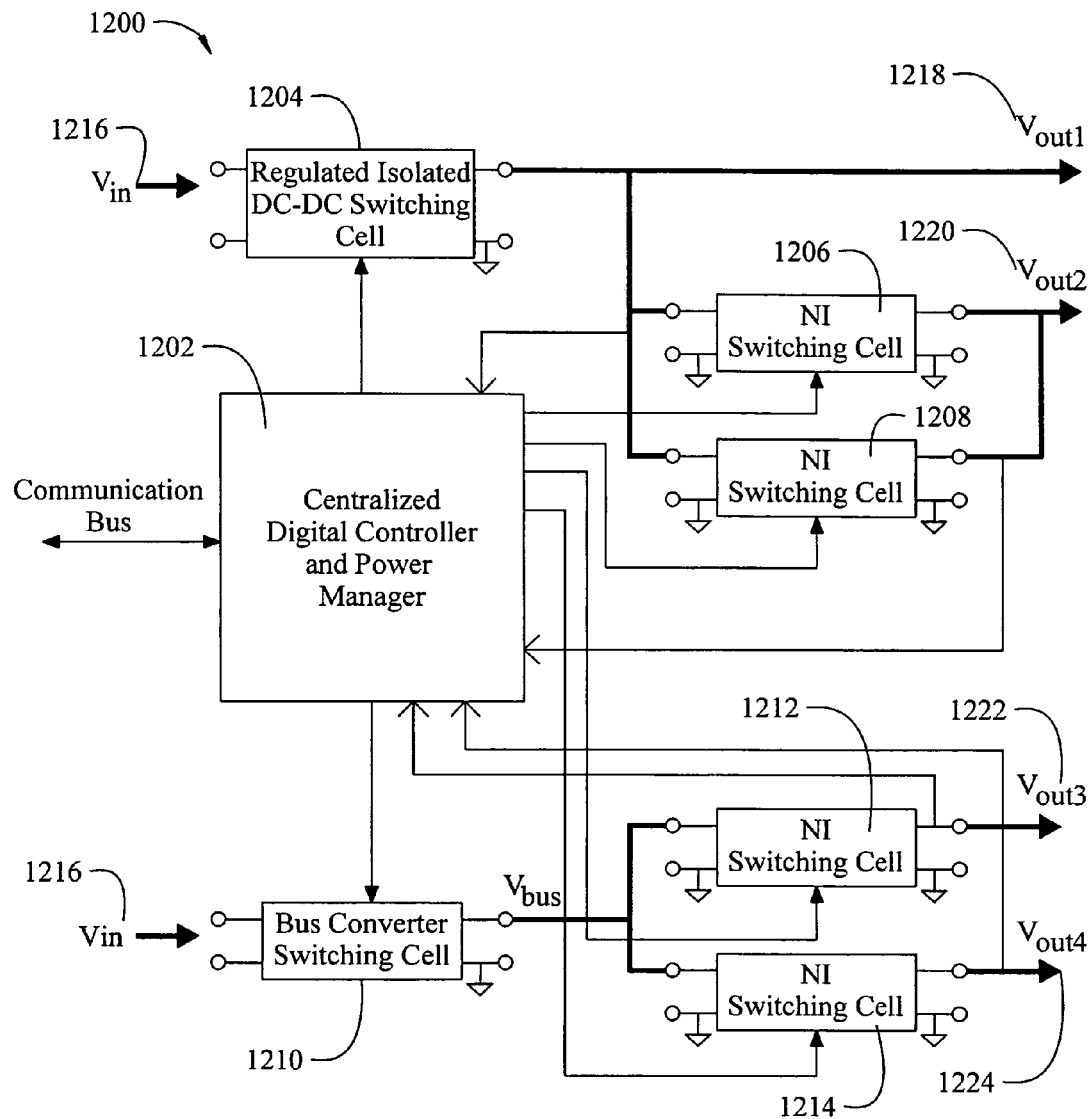
FIG. 12 is a distributed power system including a centralized digital controller and isolated and non-isolated switching cells.

A block diagram of a distributed power system 1200 is shown in FIG. 12. The distributed power system 1200 includes both DPA and IBA power architectures on the same load board. The system includes a digital controller module 1202. The DPA power structure consists of a regulated switching cell 1204 and NI switching cells 1206 and 1208 (the non-isolated switching cells are shown with an input and output port connected to ground, while the isolated switching cells are shown with only an output port connected to ground). Switching cells 1206 and 1208 are connected in parallel to provide higher output current. Current sharing technique can be implemented in the digital controller. The paralleled switching cells can supply equal current to the load by adjusting the pulse width of PWM inputs through the controller even under unbalanced cell parameters.

The IBA power architecture includes a bus converter switching cell 1210 and NI switching cells 1212 and 1214. A system input voltage 1216 is connected to the front-end intermediate bus, and there are four output voltages 1218, 1220, 1222 and 1224 available for the circuit load.

Both the DPA and IBA power architectures are controlled and managed by the centralized digital controller 1202, which may include a single or group of digital chips depending on functionality of the single chip and the complexity level of the on-board power system. Alternatively, the controller 1202 may be designed down on the load boards, as noted above. The digital controller senses and monitors the switching cell output voltages and/or other parameters such as input voltages, input and output currents, temperatures, etc.

In the disclosed distributed power system, multiple NI switching cells are supplied by the same bus voltage. Therefore, the NI switching cells can be driven through the PWM input ports with synchronized and interleaved PWM signals. By such a method the instantaneous input currents of the switching cells have a cancellation effect on one another. In this manner, EMI may be managed and limited.

Figure 13:
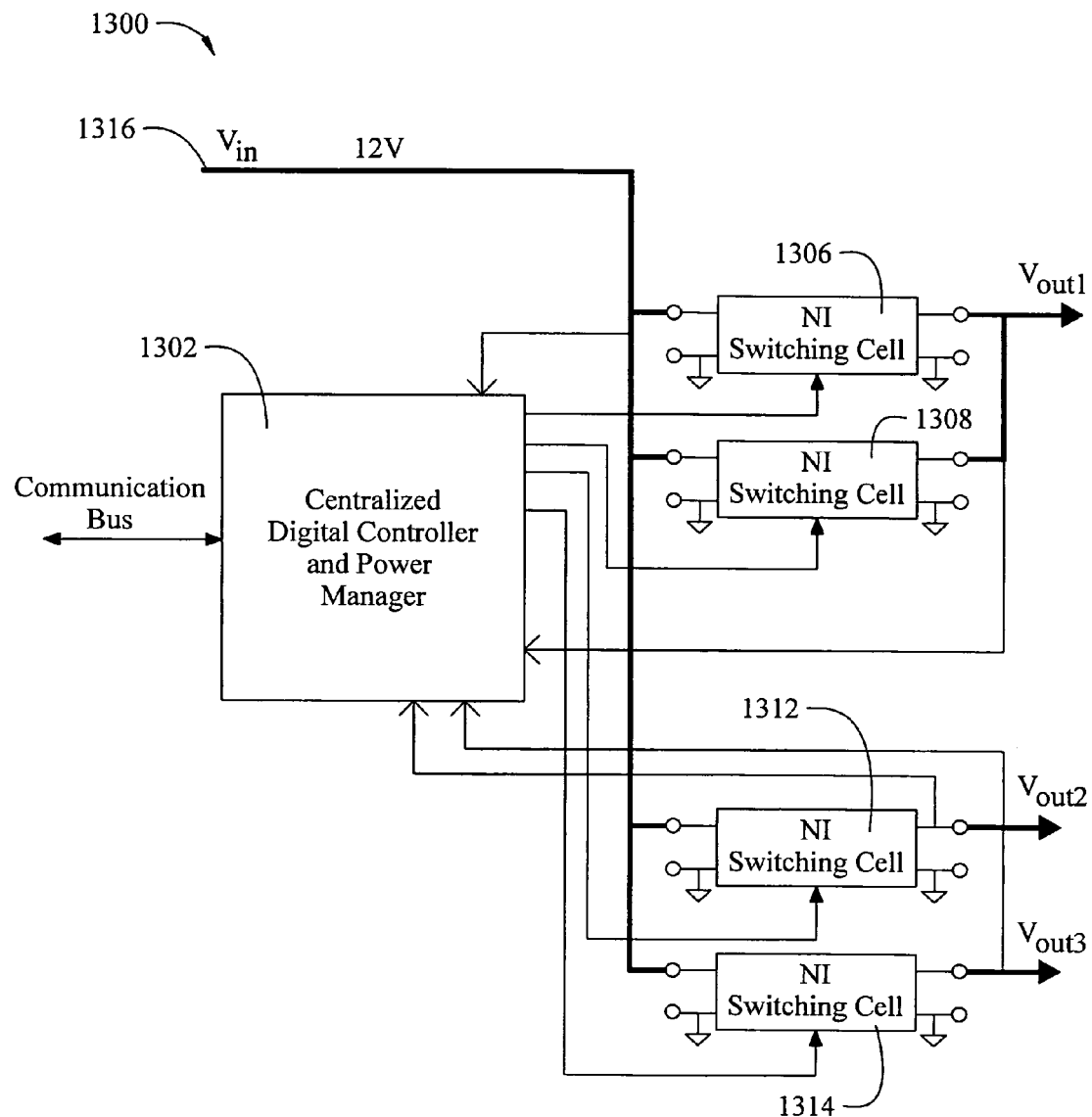
FIG. 13 is a distributed power system including a centralized digital controller and non-isolated switching cells only.

FIG. 13 shows a distributed power system 1300 where an input voltage 1316 is lower than the input voltage 1216 in FIG. 12. In this case, isolated switching cells, such as regulated isolated dc-dc switching cell 1204 and bus converter switching cell 1210, are no longer necessary. A central digital controller 1302 operates to regulate output voltages from NI switching cells 1306, 1308, 1310 and 1312 and perform power management and monitoring functions as discussed above. Such a distributed power system can be useful in computing and server applications.

Figure 14:
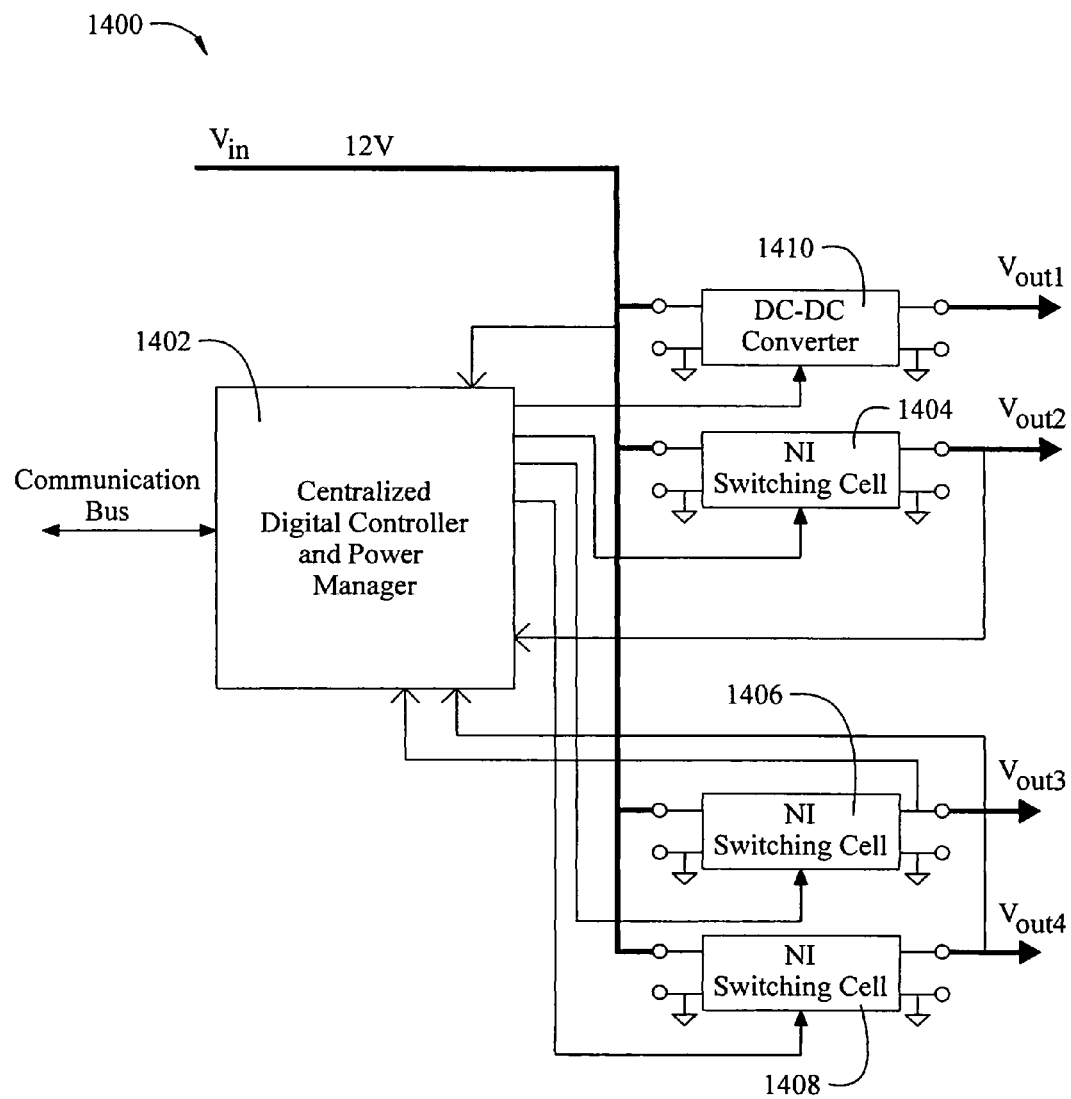
FIG. 14 is a hybrid distributed power system including a conventional dc-dc power converter, a centralized digital controller and switching cells.

As shown in FIG. 14, the centralized digital controller/manager 1402 and controlled switching cells 1404, 1406 and 1408 can be combined with a conventional dc-dc converter 1410 to form a hybrid distributed power system 1400. In such a hybrid system, conventional dc-dc converters supply some loads, while the centralized controller controls and manages the other switching cells to supply the remaining loads. This is favorable when a load system needs multiple fast-regulated voltages and the digital controller does not offer enough fast control channels. However, the centralized controller can still provide power management functions to the whole power system.

The teachings of the present disclosure provide numerous advantages. A single digital controller with multiple PWM outputs is used to control multiple on-board switching cells to generate multiple output voltages for different load needs. The control cost is, thus, significantly reduced. The design and manufacturing cost of switching cells versus full dc-dc converters are much lower. Integrated functionality of control and power management lowers the system complexity level and eliminates the communication and address buses between the power manager and dc-dc converters that would otherwise exist in digital power systems. Because all output voltages can be controlled and monitored by a centralized manager, the diagnosis of the power system is simplified and the system reliability is improved. The design cycle and time-to-market are also significantly reduced. The teachings herein separate the power design from the system design, and the power train can be easily standardized as switching cell modules packaged and sold as individual products. A mature digital controller/manager associated with the algorithms firmware, are applicable to various power systems with minimum hardware changes. The programmability of a digital controller and manager provides extreme design flexibility to the system designer. System building has minimum dependence on standardized switching cells.

As noted above, the various controllers and switching cells disclosed herein can be packaged as discrete products for attachment to circuit boards or designed down on the load boards in a board-level system design.

The teachings of this disclosure can be applied to telecom, datacom, computing, server and other industry system applications where multiple output voltages are required (including cascade power converters).

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A controller for controlling a plurality of DC-DC switching cells, each switching cell configured to generate an output voltage in response to receiving a PWM control signal from the controller, the controller comprising a plurality of output ports for outputting a plurality of PWM control signals, and at least one input port for receiving a plurality of output voltages from the plurality of switching cells, the controller configured to sample the plurality of output voltages one at a time via a multiplexer and to regulate the output voltages in response to the sampling.

2. The controller of claim 1 further configured to sample the plurality of output voltages in a sequence.

3. The controller of claim 1 further configured to regulate the output voltages by adjusting the PWM control signals in response to the sampling.

4. The controller of claim 1 further comprising at least one additional input port for receiving an output voltage from one of the plurality of switching cells.

5. The controller of claim 4 wherein the controller is configured to sample the output voltage received at said additional input port substantially continuously.

6. The controller of claim 4 further comprising a digital filter to determine an adjustment to the output voltage received by the additional input port.

7. The controller of claim 1 wherein the at least one input port includes a plurality of input ports, wherein the controller comprises the multiplexer, and wherein the multiplexer includes a plurality of inputs coupled to the plurality of input ports.

8. The controller of claim 7 further comprising an analog to digital converter having an input coupled to an output of the multiplexer.

9. The controller of claim 1 further comprising a firmware-based filter algorithm to determine an adjustment to the output voltage.

10. The controller of claim 1 further configured to perform monitoring, sequencing and margining functions for the plurality of switching cells.

11. The controller of claim 1 further comprising at least one operating parameter input port for receiving a plurality of operating parameter signals from the plurality of switching cells.

12. The controller of claim 11 further configured to sample the plurality of operating parameter signals one at a time via a multiplexer.

13. The controller of claim 1 wherein the controller comprises a digital controller.

14. The controller of claim 1 wherein the controller is configured as a controller module for attachment to a circuit board.

15. A controller for controlling a plurality of DC-DC switching cells, each switching cell configured to generate an output voltage in response to receiving a PWM control signal from the controller, the controller comprising a plurality of output ports for outputting a plurality of PWM control signals to the plurality of switching cells, and at least one input port for receiving one or more output voltages from the plurality of switching cells, the controller configured to configured to perform monitoring, sequencing and/or margining functions for the plurality of switching cells.

16. A DC-DC power converter comprising a switch, a rectifier, and an output filter coupled to the rectifier for generating a DC output voltage from a DC input voltage, a first output port for outputting the DC output voltage, a second output port for outputting a first PWM control signal to a first switching cell, and a controller for controlling said switch and generating said first PWM control signal.

17. A method of using a single controller to control a plurality of DC-DC switching cells each configured to generate an output voltage in response to a PWM control signal from the controller, the method comprising providing a PWM control signal to each of the switching cells, receiving via a multiplexer a plurality of output voltages from the plurality of switching cells, sampling the received plurality of output voltages one at a time, and adjusting the PWM control signal for one of said switching cells in response to its sampled output voltage.

18. The method of claim 17 wherein the switching cells are switching cell modules.

19. The method of claim 17 wherein the controller is a controller module.

20. The method of claim 17 wherein the controller comprises a digital controller.

21. The method of claim 17 wherein sampling the plurality of output voltages includes sampling the plurality of output voltages in a sequence.

22. The method of claim 17 wherein adjusting one of said PWM control signals includes adjusting the duty cycle of the PWM control signal by a predetermined amount.

23. The method of claim 17 wherein adjusting includes adjusting said PWM control signal for one of said switching cells when its sampled output voltage is outside a predetermined range.

24. The method of claim 23 wherein adjusting further includes adjusting the duty cycle of said PWM control signal for one of said switching cells by a predetermined amount when its sampled output voltage is outside the predetermined range.

25. The method of claim 24 wherein the predetermined amount is an amount calculated to change the sampled output voltage by approximately half of the predetermined range.

26. The method of claim 17 wherein the controller includes the multiplexer.

27. The method of claim 17 wherein the multiplexer is external to the controller.

28. The controller of claim 14 further comprising at least one operating parameter input port for receiving a plurality of operating parameter signals from the plurality of switching cells, and a multiplexer coupled to the at least one operating parameter input port, the controller configured to sample the plurality of operating parameter signals one at a time via the multiplexer coupled to the at least one operating parameter input port.

29. The controller of claim 28 further configured to sample the plurality of output voltages in a sequence and configured to regulate the output voltages by adjusting the PWM control signals in response to the sampling.

30. The controller of claim 29 further comprising at least one additional input port for receiving an output voltage from one of the plurality of switching cells, and wherein the controller is further configured to sample the output voltage received at said additional input port substantially continuously.

31. The controller of claim 30 further configured to perform monitoring, sequencing and margining functions for the plurality of switching cells.

32. The controller of claim 31 further configured to sample the plurality of output voltages in a sequence and configured to regulate the output voltages by adjusting the PWM control signals in response to the sampling.

33. The controller of claim 15 wherein the controller is configured as a controller module for attachment to a circuit board.

34. The controller of claim 33 further comprising at least one operating parameter input port for receiving a plurality of operating parameter signals from the plurality of switching cells.

35. The controller of claim 34 further configured to sample the plurality of operating parameter signals one at a time via a multiplexer.

36. The controller of claim 34 further configured to sample the one or more output voltages one at a time via a multiplexer and to regulate the output voltages in response to the sampling.

37. The controller of claim 36 further comprising at least one additional input port for receiving an output voltage from one of the plurality of switching cells, and wherein the controller is further configured to sample the output voltage received at said additional input port substantially continuously.

38. The DC-DC power converter of claim 16 further comprising an input port for receiving an output voltage of the switching cell.

39. The DC-DC power converter of claim 38 wherein the controller is further configured to regulate the output voltage of the switching cell by adjusting the PWM control signal.

40. The DC-DC power converter of claim 16 further comprising a third output port for outputting a second PWM control signal to a second switching cell, the controller further configured for generating the second PWM control signal.

41. The DC-DC power converter of claim 40 further comprising at least one input port for receiving an output voltage of the first switching cell and an output voltage of the second switching cell, the controller further configured to regulate the output voltage of the first switching cell and the output voltage of the second switching cell by adjusting the first PWM control signal and the second PWM control signal.

42. The method of claim 18 wherein the controller is a controller module.

43. The method of claim 42 wherein adjusting includes adjusting the duty cycle of said PWM control signal for one of said switching cells by a predetermined amount when its sampled output voltage is outside a predetermined range.

44. The method of claim 24 wherein the predetermined amount is an amount calculated to change the sampled output voltage by approximately half of the predetermined range.

* * * * *